United States Patent [19]

Schick et al.

[11] 4,410,486
[45] Oct. 18, 1983

[54] NUCLEAR REACTOR WITH A LIQUID COOLANT

[75] Inventors: Edgar Schick, Erlangen; Peter Wisniewski, Stade, both of Fed. Rep. of Germany

[73] Assignee: Kraftwerk Union Aktiengesellschaft, Mülheim, Fed. Rep. of Germany

[21] Appl. No.: 210,375

[22] Filed: Nov. 26, 1980

[30] Foreign Application Priority Data

Nov. 30, 1979 [DE] Fed. Rep. of Germany ....... 2948297

[51] Int. Cl.³ .............................................. G21C 9/00
[52] U.S. Cl. .................................. 376/306; 376/368; 376/372
[58] Field of Search .............. 376/282, 306, 310, 313, 376/368, 369, 372

[56] References Cited

U.S. PATENT DOCUMENTS

| | | | |
|---|---|---|---|
| 2,937,981 | 5/1960 | Allen | 376/306 |
| 3,625,820 | 12/1971 | Gluntz | 376/372 |
| 4,043,865 | 8/1977 | Krausz | 376/310 |

Primary Examiner—Donald P. Walsh
Attorney, Agent, or Firm—Herbert L. Lerner; Laurence A. Greenberg

[57] ABSTRACT

Nuclear reactor with a hydrogen-containing liquid coolant loop having an expansion tank for the coolant, a high pressure pump having a suction side and feeding coolant taken from the loop back into the loop after purification, a line bypassing the expansion tank and being connected to the suction side of the high-pressure pump, and means for introducing hydrogen into a liquid-filled section of the loop on the suction side of the high-pressure pump, including a liquid jet compressor for transporting hydrogen into the coolant.

3 Claims, 1 Drawing Figure

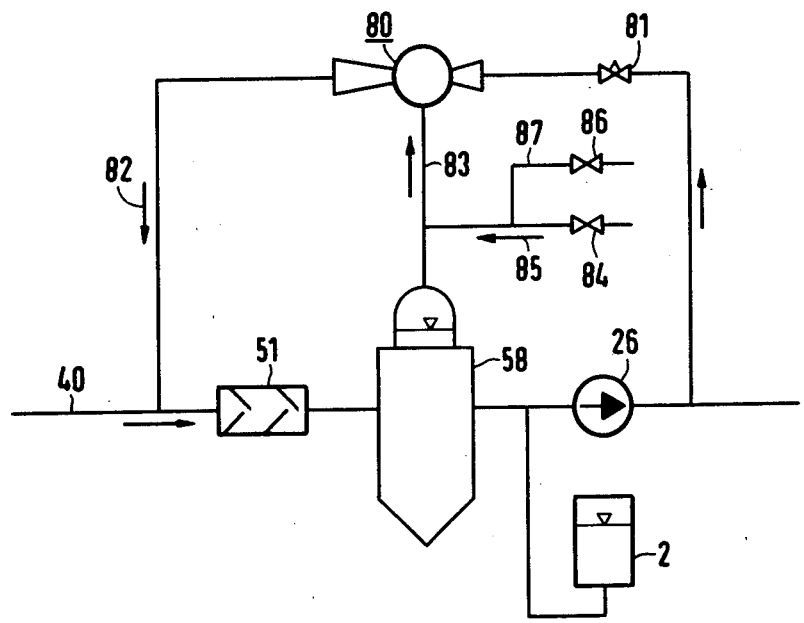

NUCLEAR REACTOR WITH A LIQUID COOLANT

The invention relates to a device for effecting hydrogen dosing with a so-called passive component, in a nuclear reactor with a coolant loop.

U.S. patent application Ser. No. 052,256, filed June 26, 1979, relates to a liquid, hydrogen-containing coolant in a cooling loop to which gaseous hydrogen is added, with an expansion tank for the coolant and a high-pressure pump that feeds coolant taken from the cooling loop, after purification, back into the cooling loop, wherein a bypass line is associated with the expansion tank which is in connection with the suction side of the high-pressure pump, and the feed point for the hydrogen is located on the suction side of the high-pressure pump in a line section which is filled with liquid. This makes it possible, in contrast to the gas supply system of a pressurized-water reactor, which is described in the book VGB-Kernkraftwerks-Seminar 1970, particularly page 41, to keep the free hydrogen volume small to that the danger of oxyhydrogen explosions is prevented. This is particularly so since the hydrogen is fed directly into the liquid and is to be mixed there without bubbles.

It is accordingly an object of the invention to provide a nuclear reactor with a liquid coolant which overcomes the hereinaforementioned disadvantages of the heretofore-known devices of this general type, and to make hydrogen dosing possible with a so-called passive component, i.e. a component which requires no separate drive motor.

With the foregoing and other objects in view there is provided, in accordance with the invention, a nuclear reactor with a hydrogen-containing liquid coolant loop having an expansion tank for the coolant, a high pressure pump having a suction side and feeding coolant taken from the loop back into the loop after purification, a line bypassing the expansion tank and being connected to the suction side of the high-pressure pump, and means for introducing hydrogen into the liquid-filled section of the loop on the suction side of the high-pressure pump, comprising a liquid jet compressor for transporting hydrogen into the coolant. A mechanically driven compressor which is still provided in the heretofore known above-mentioned invention in the form of a diaphragm compressor, can therefore be avoided.

In accordance with another feature of the invention, the pump has a pressure side and the liquid jet compressor is connected to and supplied from the pressure side of the pump, and there is provided a mixer being connected to receive from the liquid jet compressor and disposed upstream of the pump.

Through the high pressure pump, a pressure gradient for the liquid transporting the hydrogen of the liquid jet compressor is available so that the amount of hydrogen desired for the supply of gas can be pumped in any case.

In accordance with a concomitant feature of the invention, there is provided a hydrogen line connected to the liquid jet compressor, and a gas separator being connected to the hydrogen line and disposed upstream of the pump.

The jet compressor is first acted upon by the hydrogen which is present and unmixed in the coolant, i.e. in the form of bubbles, before more, i.e. additional hydrogen, is used for the gas supply.

Other features which are considered as characteristic for the invention are set forth in the appended claims.

Although the invention is illustrated and described herein as embodied in a nuclear reactor with a liquid coolant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a schematic and block diagrammatic view which shows a portion of the volume control system of a pressurized-water reactor.

Referring now in particular to the single FIGURE of the drawing, there is seen a liquid jet compressor 80, connected in parallel to a bypass line 40, which runs through a mixer 51 and a gas separator 58 to a high-pressure pump 26, and in turn is connected in parallel to the volume expansion tank 2. The liquid jet compressor 80 is connected through a control valve 81 to the pressure side of the high pressure pump 26 and, as shown by the arrow 82, pumps into the region of the bypass line 40, which is disposed ahead or upstream of the mixer 51. The jet compressor 80 is connected to the dome of the gas separator 58 through a gas line 83. A non-illustrated hydrogen source is connected to this gas line 83 through a valve 84. Through the use of the hydrogen source, the jet compressor can be supplied with hydrogen in the direction of the arrow 85. A valve 86, which likewise leads to the gas line 83 but through a collecting section 87, permits added dosing of nitrogen, if required, with the same liquid jet compressor 80.

The pressure difference setting the propulsion water stream through the liquid jet compressor in operation is approximately 20 bar; the amount of propulsion water flowing through the jet compressor 80 is, for instance, 0.5 $m^3/h$. Therefore, a gas flow of 1.3 $m^3/h$ can be pumped with a maximum pressure difference of 2 bar.

The liquid jet compressor 80 used for the supply of gas can also be supplied with propulsion liquid which comes, for instance, from the water seal supply of the main cooling pumps, as are usually available in a pressurized-water reactor but are not shown in the FIGURE. However, larger pressure variations must be expected here during the start-up and shut-down of the installation. For maintaining suitable values of the propulsion water flow or pressure, an electrical or preferably medium-controlled regulator may be provided. The control element of the regulator, the valve 81, may also in principle be structurally integrated with the jet compressor 80.

The gas flow pumped in the line 83 can also in principle be maintained at a suitable value by a control valve or throttle element, which is not shown. In some cases, a critical pressure ratio between the dome of the gas separator 58 and the suction connection of the jet compressor 80 can be utilized and a fixed choke or a register choke can be used, for instance.

The use of a liquid jet pump according to the invention with the coolant to be supplied with gas as the propulsion water, however, in any case provides the great advantage that no active devices are required, i.e. no separate drive motor. Further details and descriptions can be found in U.S. patent application Ser. No. 052,256, filed June 26, 1979, which fully sets forth a reactor cooling and purification loop in which the invention of the instant application can be used.

There are claimed:

1. Nuclear reactor with a hydrogen-containing liquid coolant loop having an expansion tank for the coolant, a high pressure pump having a suction side and feeding coolant taken from the loop back into the loop after purification, a line bypassing the expansion tank and being connected to the suction side of the high-pressure pump, and means for introducing hydrogen gas into a liquid-filled section of the loop on the suction side of the high-pressure pump, comprising a liquid jet compressor for transporting hydrogen into the coolant.

2. Nuclear reactor according to claim 1, wherein the pump has a pressure side and said liquid jet compressor is connected to the pressure side of the pump, and including a mixer being connected to said liquid jet compressor and disposed upstream of the pump.

3. Nuclear reactor according to claim 2, including a hydrogen line connected to said liquid jet compressor and a gas separator being connected to said hydrogen line and disposed upstream of the pump.

* * * * *